(12) United States Patent
Kuter-Arnebeck et al.

(10) Patent No.: US 12,521,867 B2
(45) Date of Patent: Jan. 13, 2026

(54) NON-CONDUCTIVE MAGNETIC RETRIEVAL TOOL

(71) Applicant: SNAP-ON INCORPORATED, Kenosha, WI (US)

(72) Inventors: Ottoleo Kuter-Arnebeck, Milwaukee, WI (US); Dylan Johnson, Madison, WI (US); Nicholas Alan Gabbey, Mount Pleasant, WI (US)

(73) Assignee: SNAP-ON INCORPORATED

( * ) Notice: Subject to any disclaimer, the term of this patent is extended or adjusted under 35 U.S.C. 154(b) by 1024 days.

(21) Appl. No.: 17/576,478

(22) Filed: Jan. 14, 2022

(65) Prior Publication Data

US 2022/0134536 A1    May 5, 2022

Related U.S. Application Data

(63) Continuation-in-part of application No. 16/592,373, filed on Oct. 3, 2019, now Pat. No. 11,224,966.

(51) Int. Cl.
| | | |
|---|---|---|
| *B25J 1/02* | (2006.01) | |
| *B25B 9/00* | (2006.01) | |
| *B25J 15/06* | (2006.01) | |

(52) U.S. Cl.
CPC ............... *B25J 1/02* (2013.01); *B25B 9/00* (2013.01); *B25J 15/0608* (2013.01)

(58) Field of Classification Search
CPC ........... B25J 1/02; B25J 15/0608; B25B 9/00; B25B 11/002
See application file for complete search history.

(56) References Cited

U.S. PATENT DOCUMENTS

| | | |
|---|---|---|
| 1,535,618 A | 4/1925 | Mayer |
| 2,683,618 A | 7/1954 | Long |
| 2,993,723 A | 7/1961 | Twachtman et al. |
| 3,078,073 A | 2/1963 | Zizzo |
| 3,146,015 A | 8/1964 | Roberge |
| 4,813,729 A | 3/1989 | Speckhart |
| D321,062 S | 10/1991 | Bonbright |
| 5,169,193 A | 12/1992 | Stelmach |
| 5,381,319 A | 1/1995 | Shiao |
| 5,472,253 A | 12/1995 | Resor |

(Continued)

FOREIGN PATENT DOCUMENTS

| | | |
|---|---|---|
| CN | 102548497 | 7/2012 |
| CN | 203045665 | 7/2013 |

(Continued)

OTHER PUBLICATIONS

Chinese Office Action for corresponding Application No. 2020110745020 dated Dec. 2, 2022, 15 pages.

(Continued)

*Primary Examiner* — Stephen A Vu
(74) *Attorney, Agent, or Firm* — Taft, Stettinius & Hollister LLP

(57) ABSTRACT

A non-conductive retrieval tool with a magnet connected a handle by a linkage assembly. The linkage assembly can be adjustable to maintain an orientation or position based on manipulation of a user, and can be made of a non-conductive material to safely operate in electrical applications. In some embodiments, the tool can include a socket portion near the magnet to apply torque to work pieces.

20 Claims, 12 Drawing Sheets

(56) References Cited

U.S. PATENT DOCUMENTS

| | | |
|---|---|---|
| 5,615,920 A | 4/1997 | O'Kane et al. |
| 5,662,300 A | 9/1997 | Michelson |
| 5,810,409 A | 9/1998 | Hardie |
| 5,984,864 A | 11/1999 | Fox et al. |
| 6,013,027 A | 1/2000 | Khan et al. |
| 6,042,155 A | 3/2000 | Lockwood |
| 6,193,652 B1 | 2/2001 | Berky et al. |
| 6,581,889 B2 | 6/2003 | Carpenter |
| RE38,897 E | 11/2005 | Krenzel |
| 7,052,155 B2 | 5/2006 | Gavin et al. |
| 7,182,731 B2 | 2/2007 | Nguyen |
| 7,378,928 B2 | 5/2008 | Chang |
| 7,533,906 B2 | 5/2009 | Luettgen et al. |
| 7,591,207 B1 | 9/2009 | Burhardt, II |
| 7,773,371 B2 | 8/2010 | Hillman et al. |
| 8,162,363 B2 | 4/2012 | Wang |
| 8,197,149 B2 | 6/2012 | Darrow |
| 8,602,662 B1 | 12/2013 | Mans |
| 8,620,152 B1 | 12/2013 | Martin |
| 8,789,496 B2 | 7/2014 | Axelrod et al. |
| 8,876,712 B2 | 11/2014 | Yee et al. |
| 9,095,127 B2 | 8/2015 | Kovarik et al. |
| 9,248,558 B1 | 2/2016 | Burkhardt |
| 9,694,492 B2 | 7/2017 | Sun |
| 11,224,966 B2 * | 1/2022 | Kuter-Arnebeck ........ B25J 1/02 |
| 2004/0012215 A1 | 1/2004 | Chang |
| 2004/0065176 A1 | 4/2004 | Lin |
| 2004/0089778 A1 | 5/2004 | Valentine |
| 2004/0090776 A1 | 5/2004 | Yang |
| 2005/0200143 A1 | 9/2005 | Maestas |
| 2006/0279390 A1 | 12/2006 | Chang |
| 2010/0025209 A1 | 2/2010 | Rister et al. |
| 2011/0028797 A1 | 2/2011 | Yee et al. |
| 2011/0197719 A1 | 8/2011 | Neitzell et al. |
| 2014/0028797 A1 | 1/2014 | Hattori et al. |
| 2014/0069240 A1 | 3/2014 | Dauvin |
| 2014/0137811 A1 | 5/2014 | Kovarik et al. |
| 2015/0036657 A1 | 2/2015 | Kovarik |
| 2015/0080904 A1 | 3/2015 | Kovarik |
| 2015/0157188 A1 | 6/2015 | Moskowitz et al. |
| 2015/0382489 A1 | 12/2015 | Sorensen |
| 2017/0312894 A1 | 11/2017 | Chu |

FOREIGN PATENT DOCUMENTS

| | | |
|---|---|---|
| CN | 203764469 | 8/2014 |
| CN | 106312881 | 1/2017 |
| CN | 208773419 U | 4/2019 |
| DE | 29609020 | 8/1996 |
| GB | 191405758 | 1/2017 |
| TW | 375079 | 11/1999 |
| TW | 411986 U | 11/2000 |
| TW | M250765 | 11/2004 |
| TW | I670145 | 9/2019 |
| TW | 202116493 A | 5/2021 |
| WO | 9419155 | 9/1994 |
| WO | 2008048608 A2 | 4/2008 |
| WO | 2018144820 | 8/2018 |

OTHER PUBLICATIONS

Taiwan Office Action for corresponding TW Application No. 112101443, dated Aug. 30, 2023, 6 pages.
United Kingdom Combined Search and Examination Report for corresponding UK Application No. GB2202700.7, dated Aug. 3, 2022, 6 pages.
Australian Examination Report No. 1 for corresponding AU Application No. 202224865, dated Nov. 10, 2023, 4 pages.
UK Intellectual Property Office, Examination Report issued in corresponding Application No. GB2404744.1, dated Sep. 27, 2024, 4 pp.
United Kingdom Examination Report for corresponding UK Application No. GB2014646.0 dated Nov. 11, 2021, 5 pages.
Taiwan Office Action for corresponding Taiwan Application No. 11020510940 dated Jun. 1, 2021, 14 pages.
Combined Search and Examination Report for Application No. GB2014646.0 dated Mar. 5, 2021, 7 pagesd.
Examination Report No. 1 for Application No. 2020244553 dated May 25, 2021, 4 pages.
Chinese Office Action for corresponding Chinese Application No. 202011074502.0 dated Mar. 14, 2022, 15 pages.
Australian Examination Report No. 2 for corresponding Application No. 2020244553 dated May 10, 2022, 3 pages.
Examination Report for corresponding Application No. GB2202700.7 dated Jan. 20, 2023, 4 pages.
Canadian Patent Office, Examination Report issued in corresponding Application No. 3,182,423, dated Apr. 29, 2024, 8 pp.
Australian Patent Office, Examination Report No. 1 issued in corresponding Application No. 2022279506, dated Nov. 18, 2024, 4 pp.
Australian Patent Office, Examination Report No. 2 issued in corresponding Application No. 2022224865, dated Sep. 30, 2024, 3 pp.

* cited by examiner

NON-CONDUCTIVE MAGNETIC RETRIEVAL TOOL

CROSS REFERENCES TO RELATED APPLICATIONS

This application is a continuation-in-part of and claims the benefit of U.S. patent application Ser. No. 16/592,373, Non-Conductive Magnetic Retrieval Tool, filed Oct. 3, 2019, the contents of which are incorporated herein by reference in their entirety.

TECHNICAL FIELD OF THE INVENTION

The present invention relates generally to retrieval tools. More particularly, the present invention relates to non-conductive magnetic retrieval tools with adjustable linkages.

BACKGROUND OF THE INVENTION

Retrieval tools are commonplace in automotive or electronic applications. Retrieval tools allow the user to grip or otherwise couple objects to the tool to remove the objects from a location. For example, a retrieval tool may include collapsible jaws to grip an in a claw-like fashion and remove the object when the user removes the retrieval tool from the location.

Objects that are removable with a retrieval tool include metallic objects, such as work pieces. Further, some retrieval tools are utilized in high voltage or other electrical applications where conductivity of electricity is disfavored. Still further, some retrieval tools lack versatility and are used only for retrieving objects.

SUMMARY OF THE INVENTION

The present invention broadly comprises a non-conductive retrieval tool with a handle at a first end, a magnet at a second end, and a linkage assembly connecting the handle and magnet. For example, the linkage assembly can include multiple inter-connected links, with each having a frustoconical section leading to a round section that are adapted to couple with other links, thus forming an adjustable linkage assembly that maintains an orientation and position selected by a user. The linkage assembly can be constructed of a non-conductive material to minimize conduction of electricity, such as, for example, when the tool is used in high-voltage applications. In an embodiment, the tool can include a socket portion near the magnet, for example in a terminal end of the linkage assembly, to apply torque to remote work pieces in addition to acting as a conventional retrieval tool.

In particular, the present invention broadly comprises a tool including a handle and a linkage assembly coupled to the handle. The linkage assembly includes a starting link coupled to the handle and having a starting link round portion opposite the handle, a mid-links coupled to the starting link, with a first mid-link frustoconical portion coupled to the starting link round portion, and a mid-link round portion opposite the mid-link frustoconical portion, and a terminal link coupled to the mid-link and including a magnet. In an embodiment, the links are substantially identical in construction. In an embodiment, there can be multiple mid-links, linked together, to lengthen the usability of the tool.

The present invention also broadly comprises a tool for transferring torque to a remote work piece including a handle and a linkage assembly coupled to the handle. The linkage assembly includes a starting link coupled to the handle and having a starting link round portion opposite the handle, a mid-links coupled to the start link and including a mid-link frustoconical portion coupled to the starting link round portion, and a mid-link round portion opposite the mid-link frustoconical portion, and a terminal link coupled to the mid-link and including a socket portion opposite the mid-link and a magnet between the socket portion and the mid-link. In an embodiment, the links are substantially identical in construction. In an embodiment, there can be multiple mid-links, linked together, to lengthen the usability of the tool.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
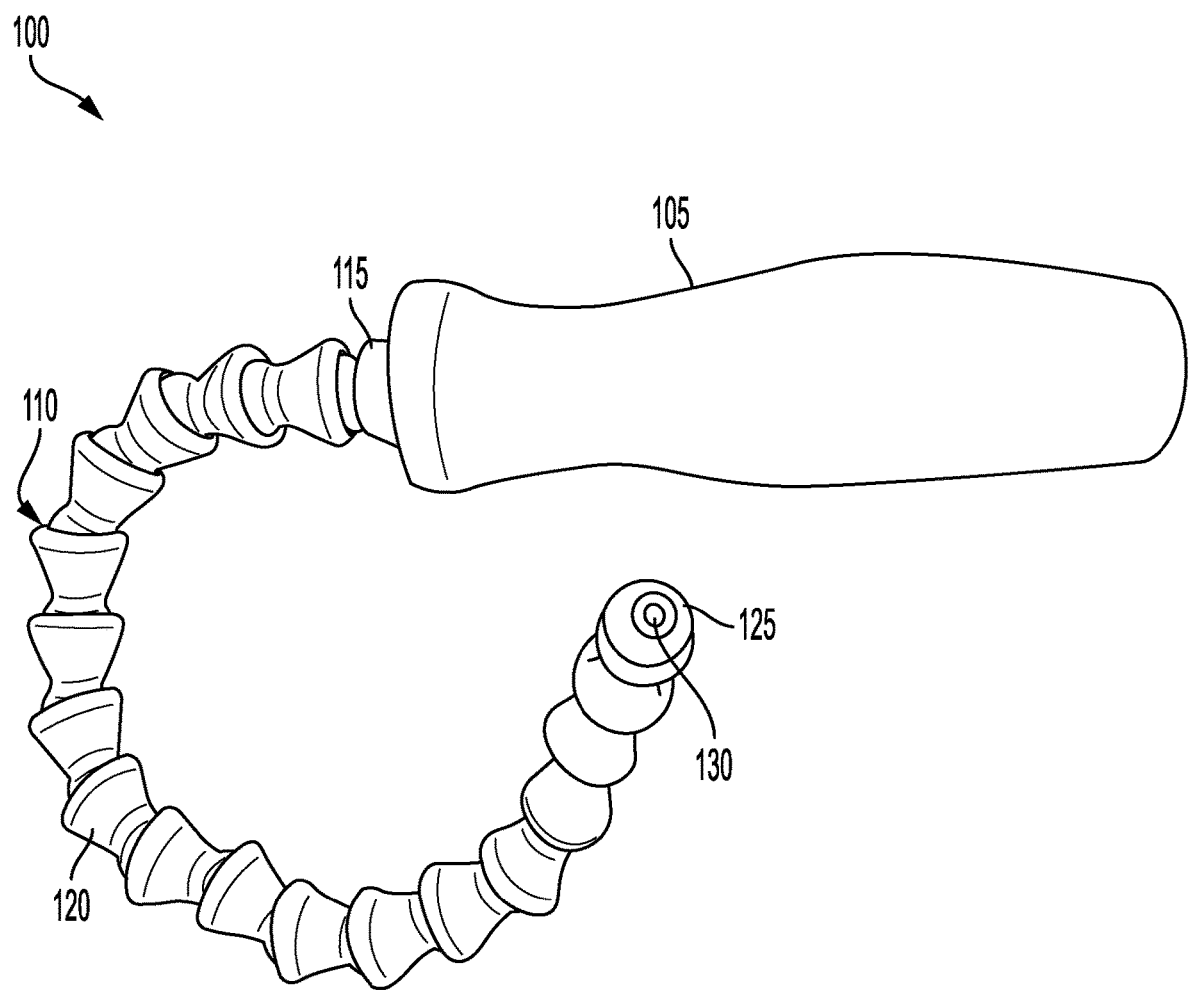
FIG. 1 is a side perspective view of a tool according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a retrieval tool. In an embodiment, a magnetic end is disposed opposite the handle to allow magnetic pickup of remote objects. For example, a linkage assembly can connect the magnetic end with handle, and can be adjustable to maintain an orientation or position based on manipulation of a user. In an embodiment, the linkage assembly can be constructed of a non-conductive material to safely operate in electrical, such as high-voltage, applications. In an embodiment, a socket portion can be disposed near the magnet, which is adapted to engage and apply torque to a remote work piece. In yet another embodiment, a lug can be disposed near the magnet, which is adapted to matingly engage a socket, which is adapted to engaged a remote work piece. The retrieval tool can therefore be used as a conventional retrieval tool, as a retrieval tool in electrical applications, as a torque-application tool, or any combination of the above.

Referring to FIG. 1, a tool 100 can include a handle 105 and a linkage assembly 110 extending from the handle 105. The linkage assembly 110 can include a starting link 115 coupled to one or more mid-links 120 and terminating with a terminal link 125. For example, several mid-links 120 can be provided and can be considered intermediary mid-links 120 between first and last mid-links 120. In an embodiment, a magnet 130 can be located in or near the terminal link to allow magnetic engagement and pickup of objects, such as metallic screws and other work pieces.

Figure 2:
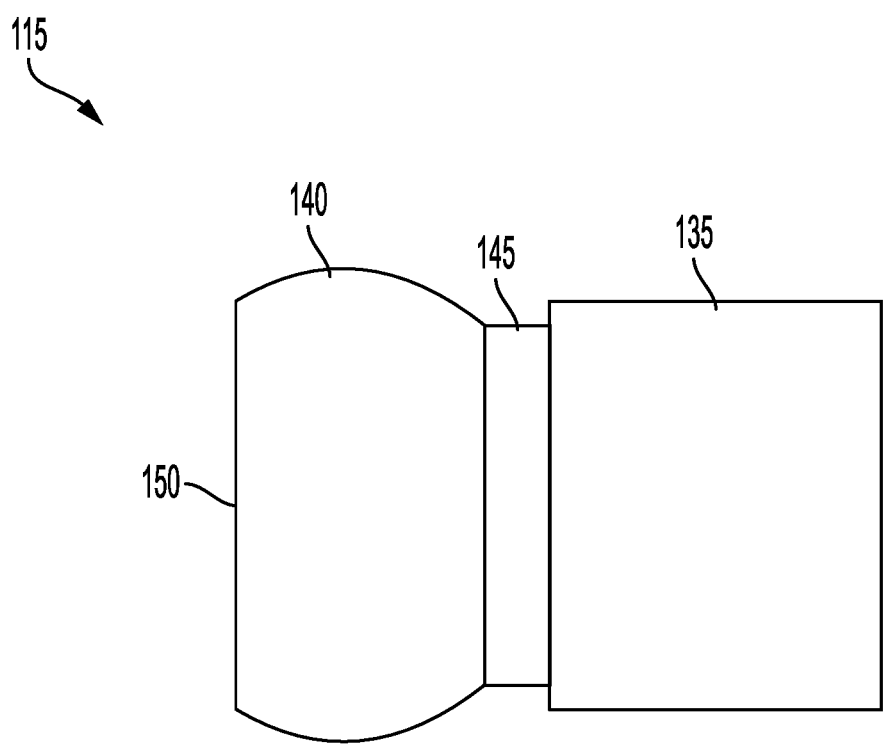
FIG. 2 is a side view of a starting link according to an embodiment of the present invention.

Referring to FIG. 2, the starting link 115 can include a base portion 135 connected to a starting link round portion 140 by a starting link neck 145. The base portion 135 can be coupled to the handle 105 in any manner, such as by adhesive, threads, welding, or any other fixed or detachable coupling method. A starting link opening 150 can be defined in the starting link round portion 140 and allow radial movement of the starting link round portion 140 when a corresponding portion of the mid-link 120 engages the starting link round portion 140. In this manner, the mid-link 120 frictionally engages the starting link round portion 140, thereby allowing the mid-link 120 to be frictionally coupled relative to the starting link 115, and can also be manually rotated about the starting link round portion 140 in a 360 degree manner to a desired position or orientation. The start linking neck 145 can provide clearance between the starting link round portion 140 and the base portion 135 to allow better rotation of the mid-link 120 about the starting link 115.

Figure 3:
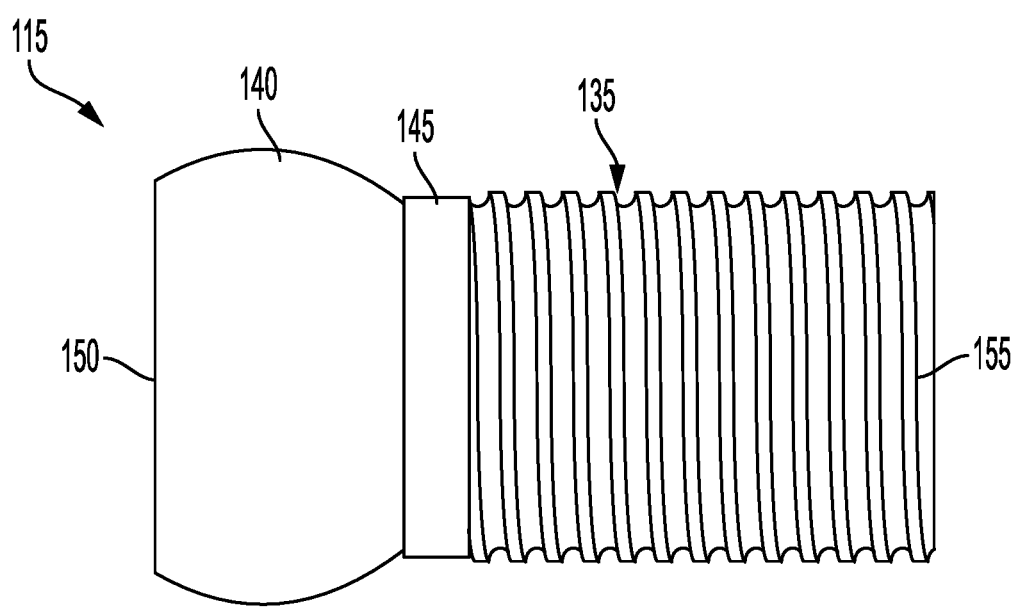
FIG. 3 is a side view of another starting link according to an embodiment of the present invention.

Referring to FIG. 3, the starting link 115 can optionally include threads 155 disposed circumferentially around the base portion 135 to allow treadable engagement between the starting link 115 and the handle 105. For example, the threads 155 of the starting link 115 can threadably engage corresponding threads located in the handle 105. In particular, as one example, the threads of the handle 105 can extend axially within an internal cavity of the handle 105.

Figure 4:
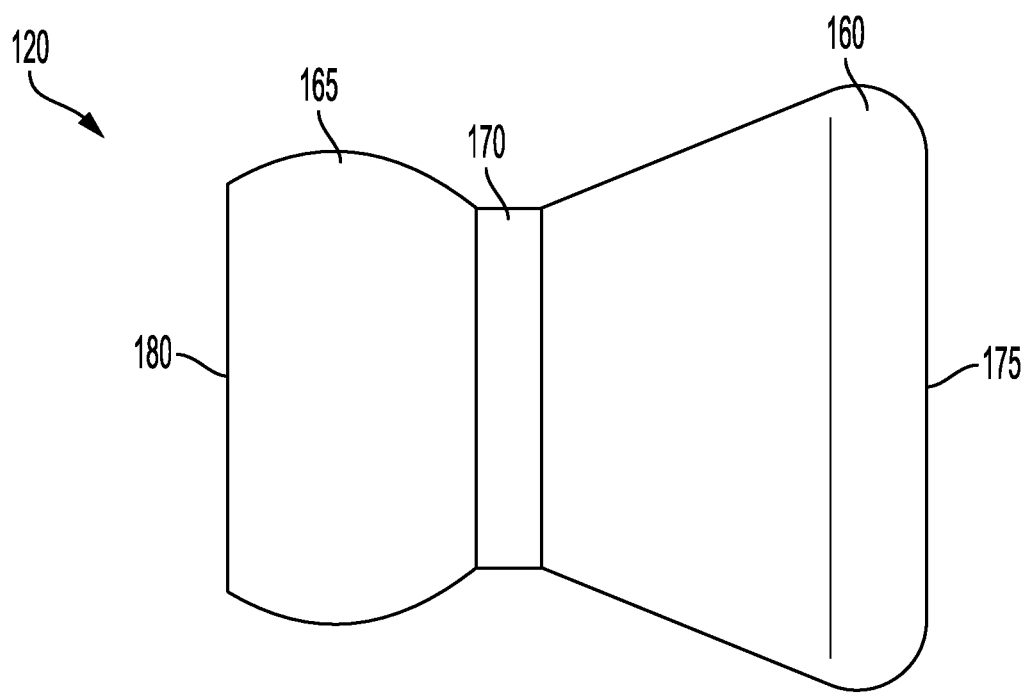
FIG. 4 is a side view of a mid-link according to an embodiment of the present invention.
Figure 5:
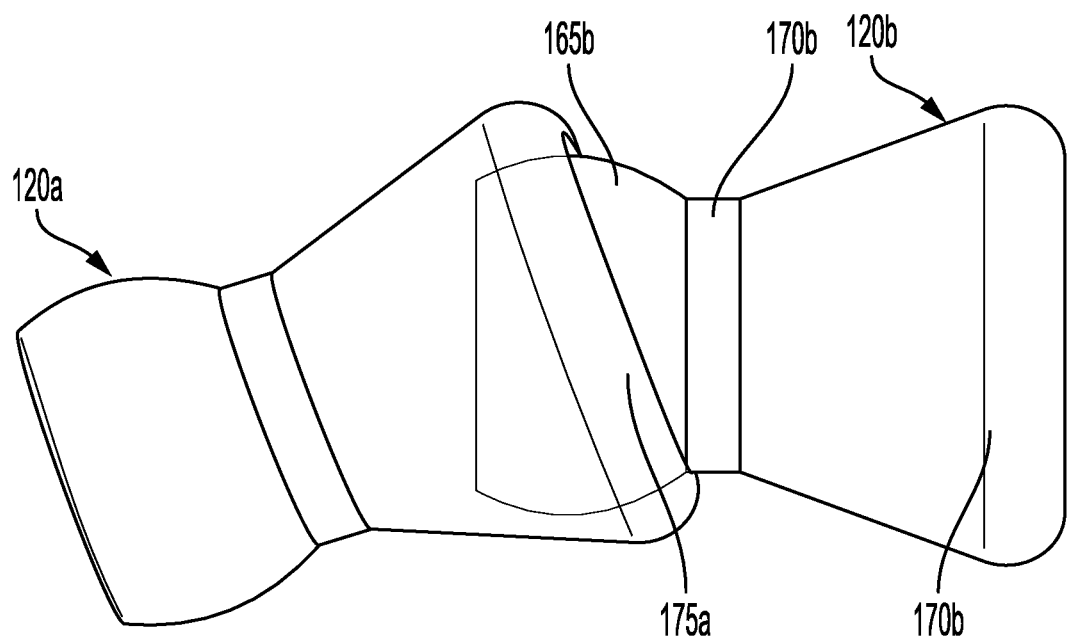
FIG. 5 is a side view of two mid-links coupled to one another according to an embodiment of the present invention.

FIG. 4 illustrates a mid-link 120 according to at least some of the presently disclosed embodiments. As shown, the mid-link 120 can include a mid-link frustoconical portion 160 coupled to a mid-link round portion 165 by a mid-link neck 170. Similar to the starting link opening 150, the mid-link 120 can include a mid-link opening 180 that allows frictional engagement and radial movement of the mid-link round portion 165 so as to permit coupling of the mid-link 120 with adjacent intermediary mid-links. For example, and as shown in FIG. 5, a first mid-link 120a can frictionally engage a second mid-link 120b by placing the mid-link frustoconical portion 175a of the first mid-link 120a over the mid-link round portion 165b of the second mid-link 120b so as to frictionally interlock the two portions. As shown, the frictional interlock between the two portions allows a user to retain a desired position and orientation, while also still allowing the first mid-link 120a can to be rotatable about the second mid-link 120b due to the ball and socket-like coupling between the two mid-links 120a,b. The mid-link neck 170b of the second mid-link 120b can provide clearance for additional rotational movement of the first mid-link 120a, for example, by spacing the mid-link frustoconical portion 175b and the mid-link round portion 165b of the second mid-link 120b from each other. In this manner, the mid-link frustoconical portion 175a of the first mid-link 120a is not obstructed by the mid-link frustoconical portion 175b of the second mid-link 120b. It will be appreciated that any number of frictionally coupled intermediary mid-links 120 can be used to achieve a desired length and usability of the tool.

Figure 6:
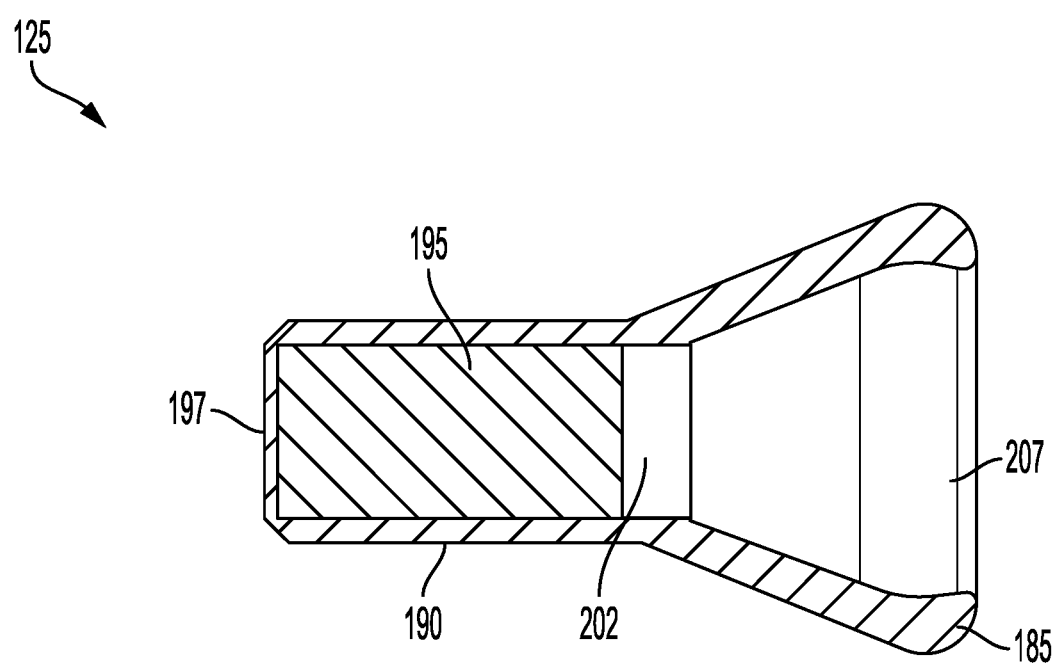
FIG. 6 is a cross-sectional view of a terminal link according to an embodiment of the present invention.

The tool 100 can terminate at a terminal link 125 of the linkage assembly 110 and can include functionality for retrieving objects, such as magnetic properties or collapsible jaws. For example, as shown in FIG. 6, the terminal link 125 can include a housing 190 with a magnet 195 located inside and extending to a wall 197. Opposite the wall 197 can be a housing barrier 202 that prevents the magnet 195 from exiting the housing 190 during use. Like the start link 115 and mid-link 120, the terminal link 115 can include a terminal link frustoconical portion 185 with a terminal link opening 207 defined therein for frictionally coupling to round portions of other links, such as the mid-link round portion 165, in a similar ball and socket type method as described above.

The magnet 195 can be used to retrieve ferromagnetic materials, such as metallic work pieces. For example, the tool 100 a can be used to magnetically couple to and retrieve screws, bolts, washers, and nuts, in hard to reach places or in areas. The amount of force applied by the magnet 195 can be designed based on the size of the magnet 195 and the thickness of the wall 197 located adjacent the magnet 195. For example, the force of the magnet 195 can be greater with a thinner wall 197 or, in some embodiments, no wall 197 is provided such that the power of the magnet 195 is allowed to retrieve objects unimpeded. As shown, the housing 190 can be cylindrically shaped to direct the magnetic strength of the magnet 195 in the proper location.

Figure 7:
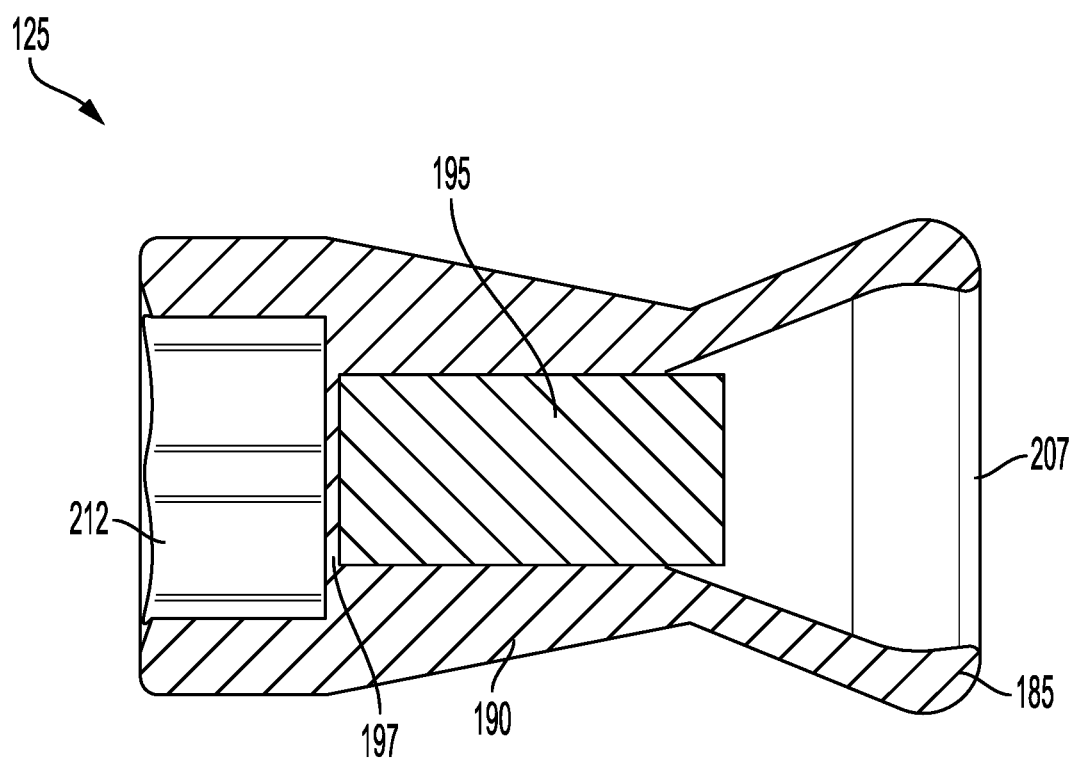
FIG. 7 is a cross-sectional view of another terminal link according to an embodiment of the present invention.

FIG. 7 illustrates a terminal link 125 that can be used not only with a retrieval tool but also as a terminal link to a tool 100 that transfers torque to remote work pieces. For example, the terminal link 125 of FIG. 7 can be located at the opposite end of the linkage assembly 110 as the handle 105 and the user can transfer torque to work pieces by rotating the handle 105. Due to the semi-rigid nature of the chain 110, the mid-links 120 can be selectively adjusted into a preferred configuration by the user, and the tool 100 can then be engaged with a work piece at the terminal link 125 to transfer the torque to the work piece.

As shown in FIG. 7, the magnet 195 can be located in a central portion of the terminal link 125 within the housing 190 and may be separated by the wall 202 from a socket portion 212. The socket portion 212 can be shaped in a hexagonal, double-hexagonal, square, or any other shape that is capable of gripping the head of a work piece and transferring torque thereto. For example, the socket portion 212 can be shaped to correspond to the shape of a head of a work piece. As discussed above, the magnet 195 can apply a magnetic force to the work piece and the power of that magnetic force can be designed based on the thickness of the wall 202 and the size and material of the magnet 195. Users can therefore use the tool 100 to grip a work piece, magnetically couple to the work piece, and apply torque to the work piece.

Figure 8:
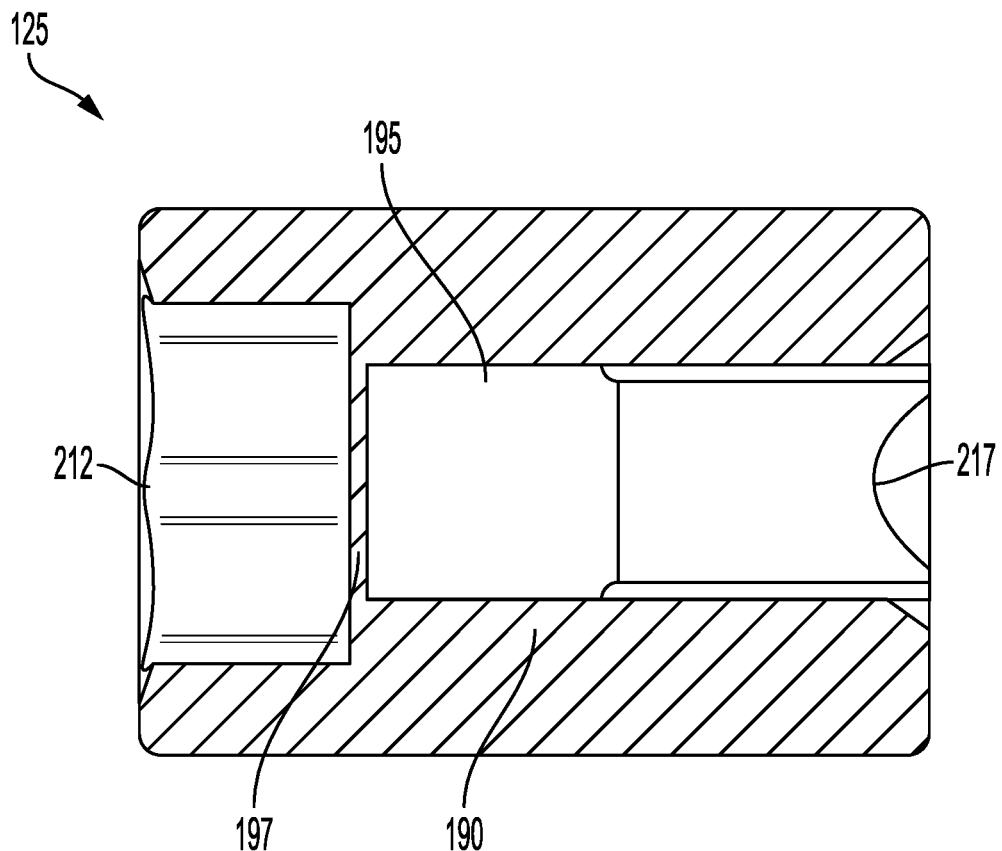
FIG. 8 is a cross-sectional view of another terminal link according to an embodiment of the present invention.

FIG. 8 illustrates another terminal link 125 according to at least some of the presently disclosed embodiments. As shown, the terminal link 125 of FIG. 8 is similar to that of FIG. 7, but includes a square drive 217 instead of a terminal link frustoconical portion 207. In this manner, the linkage assembly 110 can couple to the terminal link 125 with a square drive, and can further couple to other terminal links based on the conventional nature of the square drive coupling mechanism. The tool 100 can therefore utilize interchangeable terminal links 125 that can be used for a variety of different applications.

Figure 9:
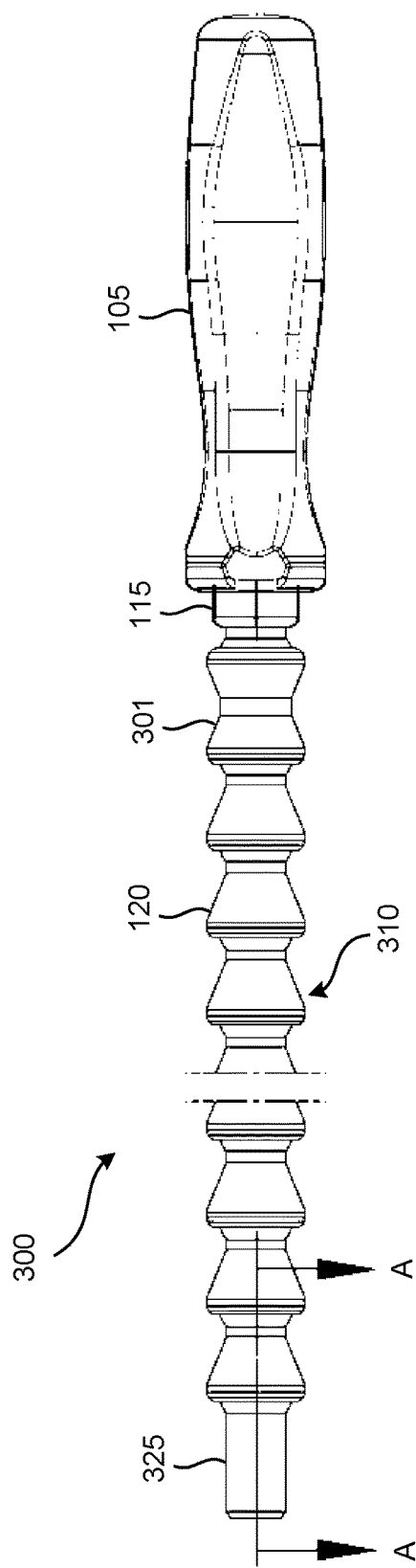
FIG. 9 is a side perspective view of a tool according to another embodiment of the present invention.

In another embodiment, the mid-links 120 can be flipped or turned around so that the mid-link frustoconical portion 160 is oriented in a direction facing away from the handle 105. For example, referring to FIG. 9, a tool 300 can include the handle 105 and the linkage assembly 310 extending from the handle 105. The linkage assembly 310 can be similar to the linkage assembly 110 described above, except the mid-links 120 are flipped or turned around so that the mid-link frustoconical portion 160 is oriented in a direction facing away from the handle 105. For example, the linkage assembly 310 can include the starting link 115 coupled to a connecting link 301, one or more mid-links 120, and a terminal link 325. For example, several mid-links 120 can be provided and can be considered intermediary mid-links 120 between first and last mid-links 120. In an embodiment, a magnet can be located in or near the terminal link 325 to allow magnetic engagement and pickup of objects, such as metallic screws and other work pieces.

The starting link 115 can be the same as described above. For example, the starting link 115 can be coupled to the handle 105, and include the starting link round portion 140 (and shown in FIGS. 2 and/or 3). The starting link 115 can also include the starting link opening 150 and allow radial movement of the starting link round portion 140 when a corresponding portion of the connecting link 301 engages the starting link round portion 140, as described in further detail below.

Figure 10:
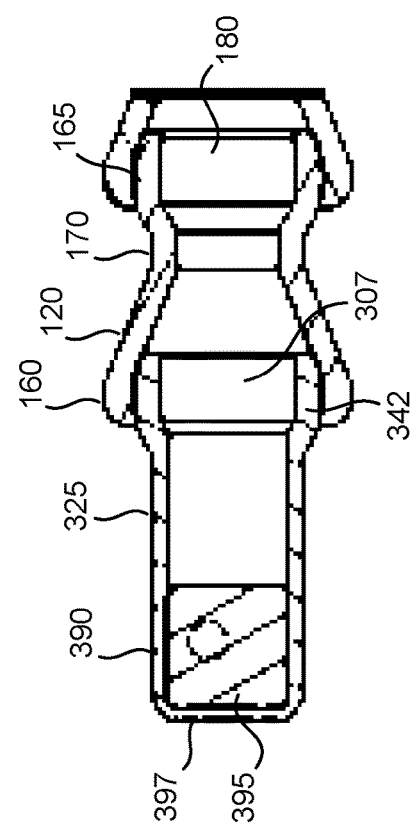
FIG. 10 is a cross-sectional view, taken along line A-A in FIG. 9, of a terminal end portion of the tool of FIG. 9.
Figure 13:
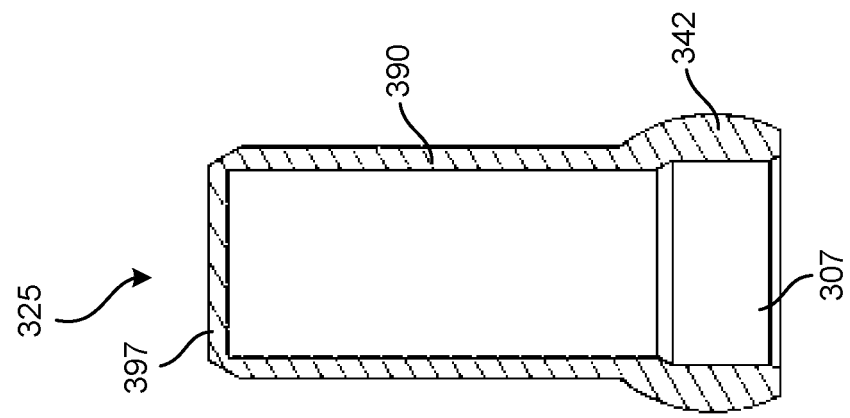
FIG. 13 is a cross-sectional view, taken along line B-B in FIG. 12, of the terminal link of FIG. 12.
Figure 12:
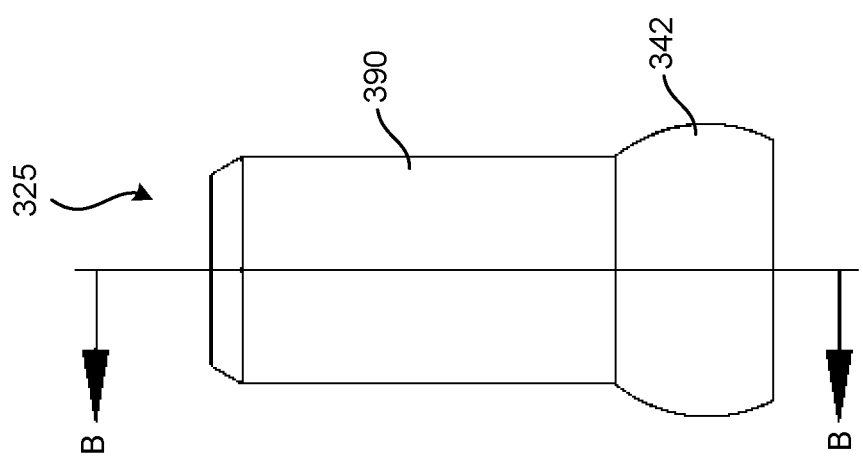
FIG. 12 is a side view of the terminal link of FIG. 11.

The mid-link 120 can also be the same as described above. For example, referring to FIG. 10, the mid-link 120 can include the mid-link frustoconical portion 160 coupled to the mid-link round portion 165 by the mid-link neck 170 (as shown in FIGS. 4 and 5). The mid-link 120 can also include the mid-link opening 180 that allows frictional engagement and radial movement of the mid-link round portion 165 so as to permit coupling of the mid-link 120 with adjacent intermediary mid-links. It will be appreciated that any number of frictionally coupled intermediary mid-links 120 can be used to achieve a desired length and usability of the tool.

Similar to the terminal link 125 described above, the terminal link 325 can include functionality for retrieving objects, such as magnetic properties or collapsible jaws. For example, referring to FIGS. 10-13, the terminal link 325 can include a housing 390 with a magnet 395 disposed in a cavity of the housing 390 and enclosed by a wall 397. The terminal link 325 includes a terminal link round portion 342 and a terminal link opening 307 that allows frictional engagement and radial movement of the terminal round portion 342 so as to permit coupling of the terminal link 325 to the mid-link 120 via engagement of the terminal link round portion 342 with the mid-link frustoconical portion 160 of the terminal mid-link 120, in a similar ball and socket type method as described above.

Figure 11:
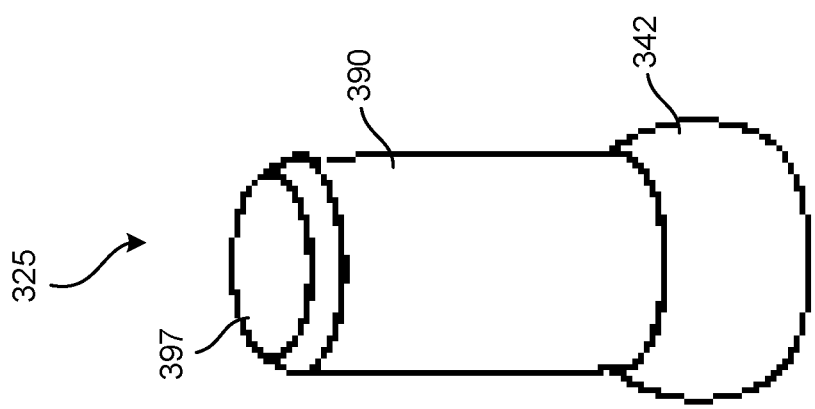
FIG. 11 is a perspective view a terminal link of the tool of FIG. 9 according to an embodiment of the present invention.
Figure 16:
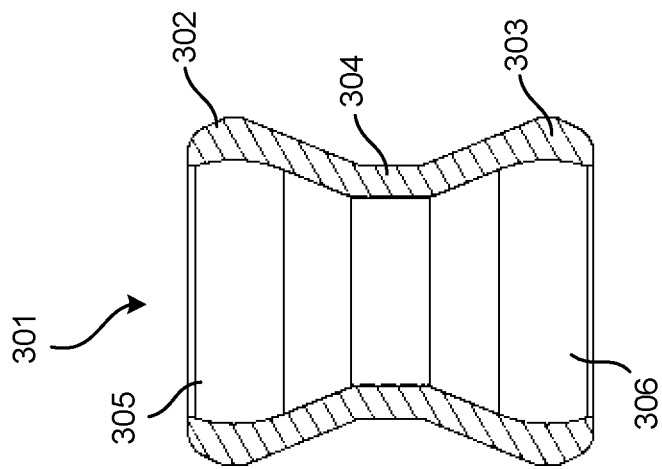
FIG. 16 is a cross-sectional view, taken along line C-C in FIG. 15, of the connecting link of FIG. 15.
Figure 15:
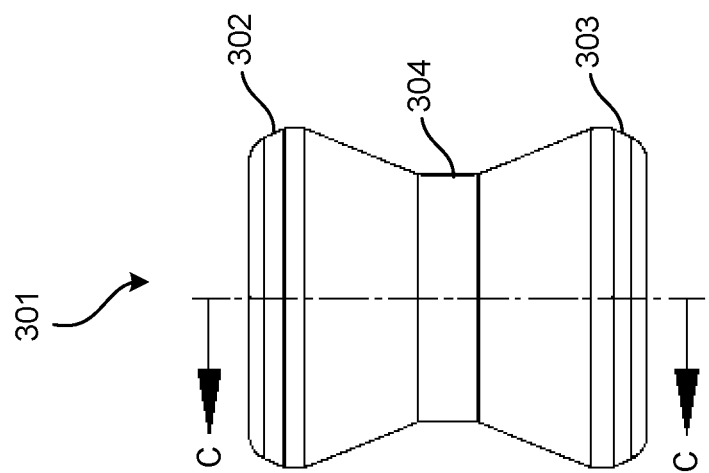
FIG. 15 is a side view of the connecting link of FIG. 14.
Figure 14:
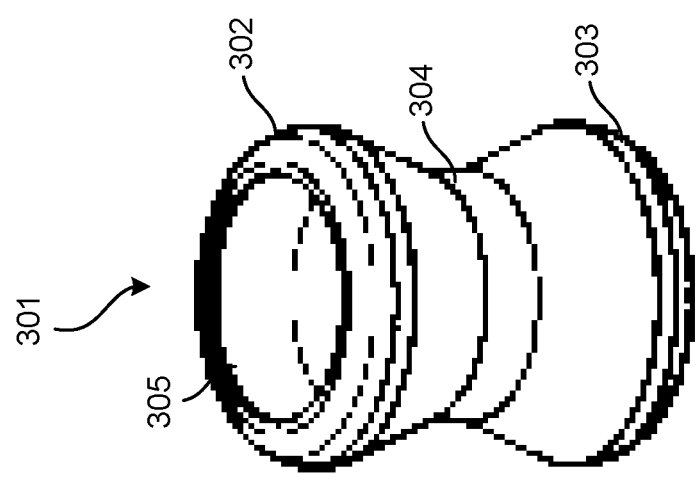
FIG. 14 is a perspective view a connecting link of the tool of FIG. 9 according to an embodiment of the present invention.

The terminal link housing 390 may have a square cross-sectional shape, instead of the cylindrical shape shown in FIG. 11. In this manner, the magnet 395 may be disposed in a cavity in the square cross-sectional shaped housing, and the square cross-sectional shape housing can be disposed in or engage the square drive 217 (square opening) shown in FIG. 8.

The magnet 395 can be used to retrieve ferromagnetic materials, such as metallic work pieces. For example, the tool 300 a can be used to magnetically couple to and retrieve screws, bolts, washers, and nuts, in hard to reach places or in areas. The amount of force applied by the magnet 395 can be designed based on the size of the magnet 395 and the thickness of the wall 397 located adjacent the magnet 395. For example, the force of the magnet 395 can be greater with a thinner wall 397 or, in some embodiments, no wall 397 is provided such that the power of the magnet 395 is allowed to retrieve objects unimpeded. As shown, the housing 390 can be cylindrically shaped to direct the magnetic strength of the magnet 395 in the proper location.

Similar to the terminal link 125, the terminal link 325 can be used not only with a retrieval tool but also as a terminal link to a tool that transfers torque to remote work pieces. For example, the terminal link 325 can be modified to include the socket portion 212, magnet 195, and wall 202 shown in FIG. 7, except with the terminal link frustoconical portion 185 shown in FIG. 7 replaced with the terminal link round portion 342.

With the mid-links 120 can be flipped or turned, and the mid-link frustoconical portion 160 of the terminal mid-link 120 engaging with the terminal link round portion 342, the mid-link round portion 165 is oriented in a direction facing towards from the handle 105. To couple the starting or initial mid-link 120 that is located proximal to the handle 105 to the starting link 115, the connecting link 301 may be used.

Referring to FIGS. 9 and 14-16, the connecting link 301 can include first and second connecting link frustoconical portions 302, 303 coupled together by a connecting link neck 304. The first and second connecting link frustoconical portions 302, 303 may also face away from each other and be on opposing ends of the connecting link 301. The first and second connecting link frustoconical portions 302, 303 can include respective connecting link openings 305, 306 that allows frictional engagement and radial movement of the connecting link 301, and permits coupling of the connecting link 301 to the starting link 115 and the starting or initial mid-link 120. For example, the first connecting link frustoconical portion 302 can engage with the starting link round portion 140, and the second connecting link frustoconical portion 303 can engage with the mid-link round portion 165 of the starting or initial mid-link 120.

Figure 17:
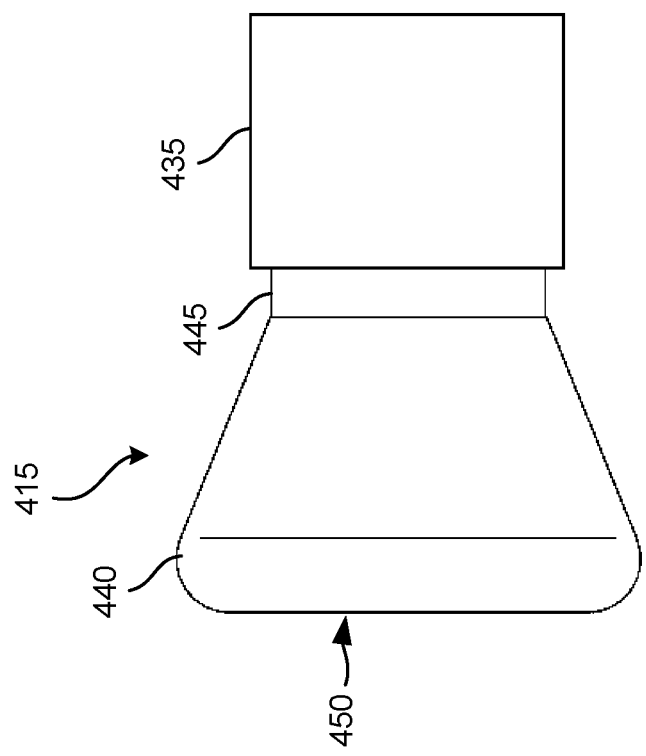
FIG. 17 is a side view of a starting link according to another embodiment of the present invention.

In other embodiments, the starting link 115 may be modified to include a starting link frustoconical portion, instead of the starting link round portion 140. For example, referring to FIG. 17, a starting link 415 can include a base portion 435 connected to a starting link frustoconical portion 440 by a starting link neck 445, and can be incorporated into the linkage assembly 310 instead of the starting link 115 and connecting link 301. The base portion 435 can be coupled to the handle 105 in any manner, such as by adhesive, threads, welding, or any other fixed or detachable coupling method.

A starting link opening 450 can be defined in the starting link frustoconical portion 440 that is adapted to engage with the mid-link round portion 165 of the starting or initial mid-link 120. The start linking neck 445 can provide clearance between the starting link frustoconical portion 440 and the base portion 435 to allow better rotation of the mid-link 120 about the starting link 415.

Figure 18:
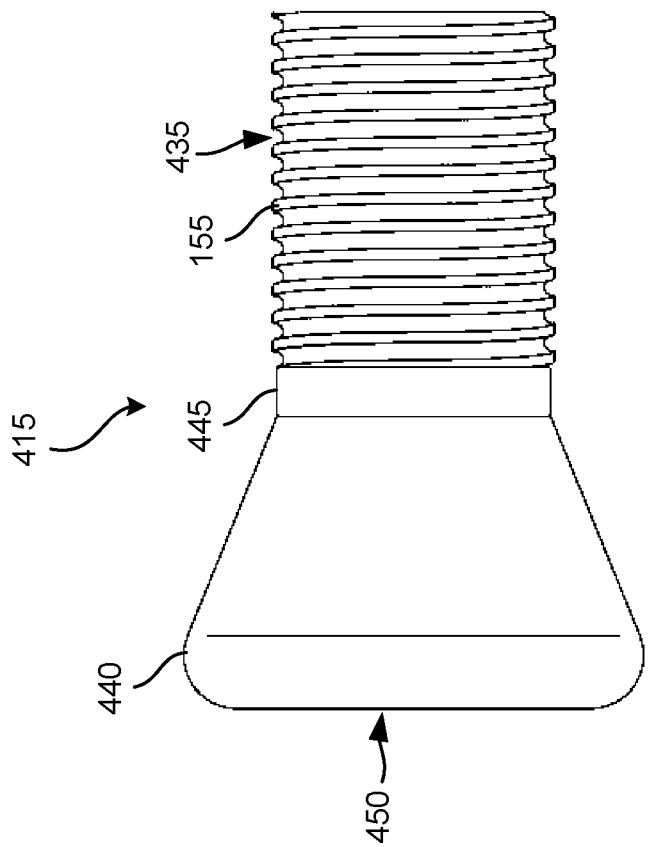
FIG. 18 is a side view of another starting link according to another embodiment of the present invention.

Referring to FIG. 18, the starting link 415 can optionally include threads 155 disposed circumferentially around the base portion 435 to allow treadable engagement between the starting link 415 and the handle 105. For example, the threads 155 of the starting link 415 can threadably engage corresponding threads located in the handle 105. In particular, as one example, the threads of the handle 105 can extend axially within an internal cavity of the handle 105.

As discussed above, the linkage assembly (such as linkage assemblies 110, 310) can be used in electrical applications where conduction of electricity is not preferred. To that end, the linkage assembly (such as linkage assemblies 110, 310) can be constructed of an electrically non-conductive material or coated with such a material. As used herein, the term "electrically non-conductive" means any material that reduces the conductivity of the linkage assembly (such as linkage assemblies 110, 310) relative to a metallic material. The linkage assembly (such as linkage assemblies 110, 310) need not be entirely composed of the electrically non-conductive material, nor does the linkage assembly (such as linkage assemblies 110, 310) need to include metal as the structural backbone material.

The linkage assembly (such as linkage assemblies 110, 310) is described herein as being semi-rigid or capable of being selectively adjusted into a preferred configuration. The linkage assembly (such as linkage assemblies 110, 310) orientation or position can therefore be manipulated as desired by the user, but can maintain its orientation or position while retrieving work pieces or transferring torque to work pieces.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A retrieval tool including a handle, the retrieval tool comprising:
   a linkage assembly including:
      a starting link coupled to the handle and including a starting link round portion opposite the handle;
      a connecting link including opposing first and second connecting link frustoconical portions, wherein the first connecting link frustoconical portion is frictionally coupled to the starting link round portion;
      a first mid-link including a mid-link round portion frictionally coupled to the second connecting link frustoconical portion;
      a second mid-link coupled to the first mid-link via one or more third mid-links, and including a mid-link frustoconical portion; and
      a terminal link including a terminal link round portion frictionally coupled to the mid-link frustoconical portion.

2. The retrieval tool of claim 1, wherein the terminal link includes a drive portion opposite the terminal link round portion.

3. The retrieval tool of claim 2, wherein the drive portion has a square cross-sectional shape.

4. The retrieval tool of claim 1, wherein the terminal link includes a socket portion opposite the terminal link round portion.

5. The retrieval tool of claim 4, wherein the socket portion has a cross-sectional shape that is any one of a hexagonal cross-sectional shape, a double-hexagonal cross-sectional shape, and a square cross-sectional shape.

6. The retrieval tool of claim 4, wherein the socket portion is shaped to engage a work piece.

7. The retrieval tool of claim 1, wherein the terminal link includes a magnet.

8. The retrieval tool of claim 7, wherein the magnet is disposed within a housing of the terminal link.

9. The retrieval tool of claim 8, wherein the terminal link includes a wall within the housing on a side of the housing opposite the terminal link round portion.

10. The retrieval tool of claim 9, wherein the terminal link includes a barrier opposite the wall and forming the housing.

11. The retrieval tool of claim 8, wherein the housing is cylindrically-shaped.

12. The retrieval tool of claim 1, wherein the terminal link includes collapsible jaws.

13. The retrieval tool of claim 1, wherein the linkage assembly is at least one of constructed of an electrically non-conductive material and coated with an electrically non-conductive material.

14. A retrieval tool including a handle, the retrieval tool comprising:
   a linkage assembly including:
      a starting link coupled to the handle and including a starting link frustoconical portion opposite the handle;
      a first mid-link including a mid-link round portion frictionally coupled to the starting link frustoconical portion;
      a second mid-link coupled to the first mid-link via one or more third mid-links, and including a mid-link frustoconical portion; and
      a terminal link including a terminal link round portion frictionally coupled to the mid-link frustoconical portion.

15. The retrieval tool of claim 14, wherein the terminal link includes a drive portion opposite the terminal link round portion.

16. The retrieval tool of claim 14, wherein the terminal link includes a socket portion opposite the terminal link round portion.

17. The retrieval tool of claim 16, wherein the socket portion is shaped to engage a work piece.

18. The retrieval tool of claim 14, wherein the terminal link includes a magnet.

19. The retrieval tool of claim 18, wherein the magnet is disposed within a housing of the terminal link.

20. The retrieval tool of claim 14, wherein the linkage assembly is at least one of constructed of an electrically non-conductive material and coated with an electrically non-conductive material.

\* \* \* \* \*